United States Patent
Poiret

[11] Patent Number: 5,993,339
[45] Date of Patent: Nov. 30, 1999

[54] CHAIN TENSIONER WITH A SPRING AND HYDRAULIC FLUID ACTING ON BOTH SIDES OF A PISTON

[75] Inventor: Christian Poiret, Calais, France

[73] Assignee: Renold PLC, United Kingdom

[21] Appl. No.: 08/950,688

[22] Filed: Oct. 15, 1997

[30] Foreign Application Priority Data

Oct. 15, 1996 [GB] United Kingdom .................. 9621440

[51] Int. Cl.$^6$ ...................................... F16H 7/08
[52] U.S. Cl. ............................ 474/109; 474/111
[58] Field of Search ...................... 474/109, 111

[56] References Cited

U.S. PATENT DOCUMENTS

| | | | |
|---|---|---|---|
| 2,893,255 | 7/1959 | Bayliss | 474/111 |
| 3,960,026 | 6/1976 | Hibino | 474/110 |
| 4,284,192 | 8/1981 | Taylor | 198/813 |
| 4,411,638 | 10/1983 | Wilson | 474/138 |
| 4,525,153 | 6/1985 | Wilson | 474/138 |
| 4,889,087 | 12/1989 | Bergsten | 123/90.31 |
| 4,976,661 | 12/1990 | Ojima | 474/138 |
| 5,037,358 | 8/1991 | Ojima | 474/111 |
| 5,088,457 | 2/1992 | Ferrazzi | 123/90.31 |
| 5,109,813 | 5/1992 | Trzmiel et al. | 123/90.15 |
| 5,117,786 | 6/1992 | Trzmiel et al. | 123/90.31 |
| 5,720,684 | 2/1998 | Mott | 474/110 |

FOREIGN PATENT DOCUMENTS

| | | |
|---|---|---|
| 90102948 | 2/1990 | European Pat. Off. . |
| 3832512 C1 | 9/1988 | Germany . |
| 3801290 | 7/1989 | Germany . |
| 4100503 | 11/1992 | Germany . |
| 2110757 | 3/1985 | United Kingdom . |

OTHER PUBLICATIONS

DE 3832512—Tensioning Device for an Endless Flexible Transmission, 1–sheet abstract in English Language.

*Primary Examiner*—Tamara L. Graysay
*Assistant Examiner*—David M. Fenstermacher
*Attorney, Agent, or Firm*—Akin, Gump, Strauss. Hauer & Feld, L.L.P.

[57] ABSTRACT

A chain tensioner for tensioning a chain in a drive of an internal combustion engine comprises a piston displaceable within a chamber. The piston is biased by a compression spring so that it protrudes from the housing towards the chain to provide the tension. The chamber has an inlet connected to a supply of oil from the engine. The oil acts on each side of the piston with substantially the same pressure such that the piston is damped in both directions when moving in the chamber. The surface areas of the piston on which the oil acts may be substantially equal so that no tensioning force is supplied by the oil.

6 Claims, 1 Drawing Sheet

5,993,339

CHAIN TENSIONER WITH A SPRING AND HYDRAULIC FLUID ACTING ON BOTH SIDES OF A PISTON

BACKGROUND OF THE INVENTION

The present invention relates to a chain tensioner particularly, but not exclusively, of the kind for maintaining tension in a transmission chain of an internal combustion engine.

In an internal combustion engine in which a chain is used to transmit driving power from the crankshaft to the camshaft, tension is conventionally imparted to the chain by means of a tensioner that comprises a piston that is biased out of a cylinder by means of hydraulic pressure, spring force or a combination thereof. A tensioning shoe is connected to the end of the piston and bears against the chain.

In known tensioner designs the chain is over-tensioned in order to ensure that it is sufficiently tensioned when the engine is inoperative and the chain is therefore relatively slack. Over-tensioning increases chain wear and vibration the latter of which increases with engine speed.

The problems of over-tensioning are exacerbated in the case of chain transmissions for driving balance shaft drives or auxiliary chain drives such as those used to drive a water or oil pump or an ignition distributor. In such circumstances the chain may be driven at a speed higher than that driving the camshaft but, as the reverse torque of the driven sprocket is low, the tension imparted to the chain is only required to be relatively low.

SUMMARY OF THE INVENTION

It is an object of the present invention to obviate or mitigate the aforesaid disadvantages and to provide for a simplified tensioner for applications where the load is relatively low.

According to the present invention there is provided a chain tensioner for tensioning a chain in a drive of an internal combustion engine comprising a piston displaceable within a chamber and biased by a spring so that it protrudes from the housing towards the chain, wherein the chamber has an inlet connected to a supply of hydraulic fluid from the engine and in use the hydraulic fluid acts on each side of the piston with substantially the same pressure such that the piston is damped in both directions when moving in the chamber.

Conveniently there is provided a clearance between the piston and a surrounding wall of the chamber so as to permit passage of the hydraulic fluid across the piston. This enables the pressure to equalise on each side of the piston.

Preferably surface areas on which the hydraulic fluid acts on each side of the piston are substantially equal. The resultant force applied by the hydraulic fluid to the piston is zero. Alternatively the piston is a differential piston so that the hydraulic fluid provides force in addition to the biasing force of the spring.

The spring may be a compression spring acting between the piston and a wall of the chamber.

Advantageously the hydraulic fluid is supplied from oil in the engine.

A vent may be provided to permit air in the hydraulic fluid to escape from the chamber.

A check valve may be provided at or adjacent the inlet.

BRIEF DESCRIPTION OF THE DRAWING

A specific embodiment of the present invention will now be described, by way of example only, with reference to the accompanying of FIG. 1 drawing which depicts a diagrammatic sectioned view of a tensioner according to the present invention.

DETAILED DESCRIPTION

Figure 1:
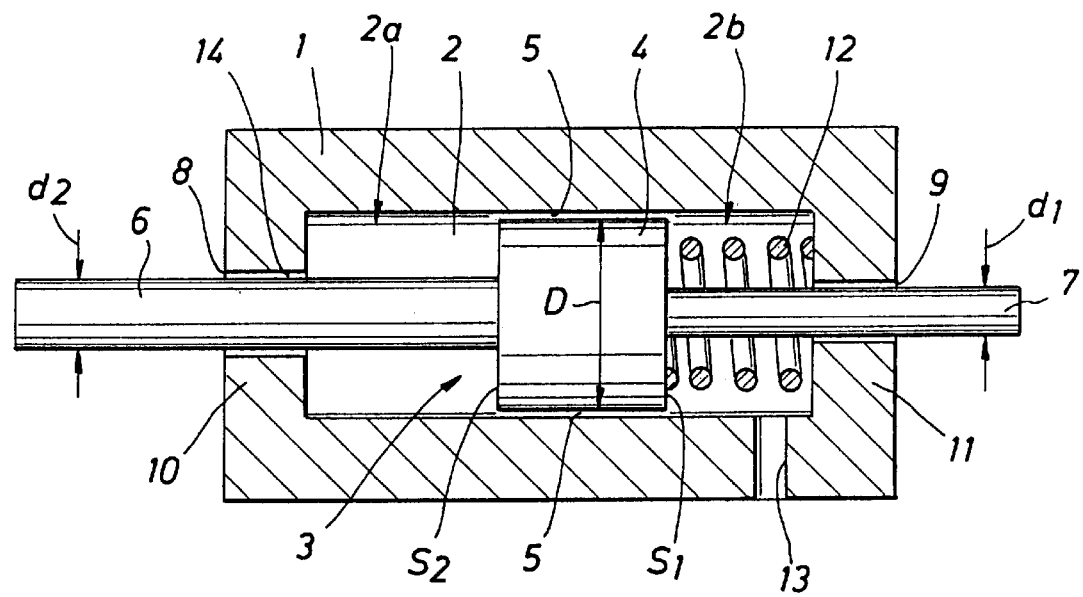

Referring now to the drawing there is shown a cylindrical housing 1 having an interior bore 2 in which a piston 3 is received. The piston 3 has a head 4 that fits closely within the bore 2 with a small circumferential clearance 5, and a pair of integral coaxial rods 6,7 one of which projects at each end of the head 4. Each rod 6,7 projects coaxial to the bore 2 through an aperture 8,9 provided in an end wall 10,11 of the housing 1.

The piston head 4 divides the bore 2 into two variable volume chambers 2a, 2b which are interconnected by the circumferential clearance 5 between the piston head 4 and the housing 1. In one of the chambers 2b (to the right in the exemplary drawing) there is a compression spring 12 fitted over the rod 7 that acts between one end of the piston head 4 and the adjacent end wall 11 of the housing 1 so as to bias the piston 3 to the left so that the rod 6 projects out of the end wall 10 of the housing 1. The same chamber 2b is connected to a supply of oil from the engine by an inlet 13 in the cylindrical wall of the housing 1.

In the embodiment shown in the drawing the diameter $d_1$ of rod 7 is less than the diameter $d_2$ of the other rod 6. The diameter of the piston head 4 is indicated by dimension D.

The tensioner is assembled, for example, in a balance shaft transmission (not shown) of an internal combustion engine which comprises a chain (not shown) for transmitting driving force from the engine crankshaft (not shown) to one or more balance shafts that are designed to damp engine vibrations. Each balance shaft has a driven sprocket (not shown) to which the chain is connected. The tensioner is positioned so that a tensioning shoe (not shown) connected to the end of rod 6 bears against the chain.

In use the compression spring 12 biases the rod 6 out of the piston housing 1 and against the chain thereby providing tension to the chain. Oil from the engine is supplied by a pressure line (not shown) and enters the housing at chamber 2b through the inlet 13. The oil is able to pass through the clearance 5 between the piston head 4 and the housing 1 to occupy chamber 2a so that equal hydraulic pressure acts on both ends of the piston head 4. A small clearance 14 is provided between rod 6 and the end wall 10 of the housing 1 that defines aperture 8 so as to ensure air is purged from the oil in the housing 1 when the engine is started. This purging of air avoids problems that would occur if air trapped in the oil was compressed during the piston stroke. The oil in the housing provides hydraulic damping of tensioner vibration that occurs at certain resonance speeds and as a result of torsional vibration in the driven sprocket to which the chain is connected.

The tensioning force applied to the chain is set by the relatively low mechanical force applied by the compression spring 12. The force applied by the hydraulic pressure on each side of the piston 3 is dependent on the surface area $S_1$, $S_2$ on which it acts, where:

$$S_1 = \pi/4(D^2 - d_1^2)$$
$$S_2 = \pi/4(D^2 - d_2^2)$$

The resultant force acting on the piston is proportional to the difference between the surface areas $S_1$, $S_2$ of the piston ends i.e.

$$S_1 - S_2 = \pi/4(d_2^2 - d_1^2)$$

When the diameters $d_1$, $d_2$ of the rods 6,7 are equal the exposed end surfaces $S_1$, $S_2$ of the piston 3 are equal and no load is applied by the hydraulic pressure. In this case the only load applied to the tensioning shoe is that provided by the compression spring 12. This is advantageous in that hydraulic damping can be provided by oil supplied from the engine but the load applied to the chain is independent of oil pressure or engine speed. Moreover, effective damping can be achieved without putting any extra load on the chain thereby maintaining chain wear and noise at low values.

In certain applications the tensioner may have a differential piston. Such a piston may be provided by making the diameter $d_2$ of rod 6 greater than that ($d_1$) of rod 7 so that there is a difference between the exposed surface areas $S_1$, $S_2$. In this case $S_1 > S_2$ and since the hydraulic pressure is equal on both sides the resultant force moves the piston 3 to the left to increase chain tension. Thus by using a differential piston the hydraulic pressure can contribute to the tension force.

The size of the piston diameter D and the clearance 14 between the piston head 4 and the housing 1 are selected to provide optimum tensioning and damping for each particular application. For example, if the clearance 14 is too small the passage of oil through the clearance is restricted and damping is impaired. However, if the clearance is too great for the particular application the damping will not be sufficiently effective.

The design is relatively simple compared to existing design and obviates the need for several features present in existing tensioners. It is therefore of relatively low cost and high reliability. For example, there is no need to provide a throttling arrangement in the supply of oil to the housing or within the housing itself.

Figure 2:
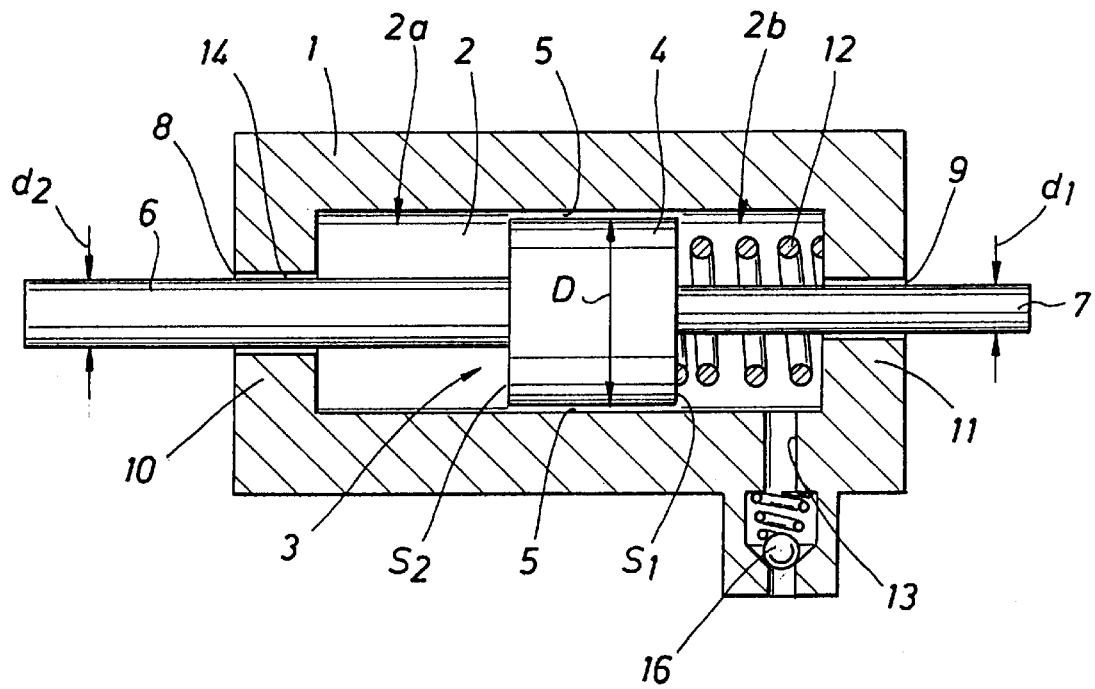
FIG. 2 is a view identical to FIG. 1 with a check valve added.

It will be appreciated that numerous modifications to the above described design may be made without departing from the scope of the invention as defined in the appended claims. For example, referring to FIG. 2 it may be necessary to include a check valve 16 at the oil inlet to increase the hydraulic pressure within the tensioner housing.

I claim:

1. A chain tensioner capable of tensioning a chain in a drive of an internal combustion engine, comprising:

a housing having a chamber;

a piston assembly displaceable within said chamber and biased by a spring so that said piston assembly protrudes from the housing towards the chain;

clearance defined between the piston assembly and a surrounding wall of the chamber, said clearance permitting passage of the hydraulic fluid across the piston assembly;

a vent defined between the piston assembly and said housing at the point where the assembly protrudes from the housing, said vent permitting air in the hydraulic fluid to escape from the chamber, wherein the chamber has an inlet connected to a supply of hydraulic fluid from the engine and in use the hydraulic fluid acts on each side of the piston assembly with substantially the same pressure such that the piston assembly is damped in both directions when moving in the chamber.

2. A chain tensioner according to claim 1, wherein surface areas on which the hydraulic fluid acts on each side of the piston assembly are substantially equal.

3. A chain tensioner according to claim 1, where the piston assembly is a differential piston.

4. A chain tensioner according to claim 1 in which the spring is a compression spring acting between the piston assembly and a wall of the chamber.

5. A chain tensioner according to claim 1, wherein the hydraulic fluid is oil from the engine.

6. A chain tensioner according to claim 1, where a check valve is provided at or adjacent the inlet.

* * * * *